US012603490B2

(12) United States Patent
Salo et al.

(10) Patent No.: US 12,603,490 B2
(45) Date of Patent: Apr. 14, 2026

(54) PROTECTIVE DEVICE WITH MULTI-CHANNEL LINE CURRENT DIFFERENTIAL PROTECTION

(71) Applicant: Schweitzer Engineering Laboratories, Inc., Pullman, WA (US)

(72) Inventors: Cole Salo, Butte, MT (US); Austin Edward Wade, Moscow, ID (US); William Glennon, Billings, MT (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 138 days.

(21) Appl. No.: 18/499,558

(22) Filed: Nov. 1, 2023

(65) Prior Publication Data

US 2025/0141205 A1     May 1, 2025

(51) Int. Cl.
| H02H 3/00 | (2006.01) |
| H02H 1/00 | (2006.01) |
| H02H 3/08 | (2006.01) |

(52) U.S. Cl.
CPC ............ H02H 3/08 (2013.01); H02H 1/0007 (2013.01)

(58) Field of Classification Search
CPC .............................. H02H 3/08; H02H 1/0007
USPC .......................................................... 361/87
See application file for complete search history.

(56) References Cited

U.S. PATENT DOCUMENTS

| 3,781,706 A | 12/1973 | Osborne |
| 4,387,336 A | 6/1983 | Joy |

| 4,829,298 A | 5/1989 | Fernandes |
| 5,006,846 A | 4/1991 | Granville |
| 5,224,011 A | 6/1993 | Yalla |
| 5,341,265 A | 8/1994 | Westrom |
| 5,367,426 A | 11/1994 | Schweitzer, III |
| 5,446,682 A | 8/1995 | Janke |
| 5,498,956 A | 3/1996 | Kinney |
| 5,592,393 A | 1/1997 | Yalla |

(Continued)

OTHER PUBLICATIONS

Debra Carroll, John Dorfner, Tony Lee, Ken Fodero, Chris Huntley, Resolving Digital Line Current Differential Relay Security and Dependability Problems: A Case History, 29th Annual Western Protective Relay Conference, Spokane Washington, Oct. 22-24, 2002.

(Continued)

*Primary Examiner* — Crystal L Hammond
*Assistant Examiner* — Lucy M Thomas
(74) *Attorney, Agent, or Firm* — Justin K. Flanagan

(57) ABSTRACT

The presently described systems and methods include differential protection architectures for power lines, including three-phase transmission lines and distribution lines, in which each protective device monitors and protects more than one power line. A protective device with multi-channel line current differential protection provides additional security from data corruption and/or single event upsets. A protective device on one end of a transmission line may include multiple communication channels to simultaneously receive independent differential data (e.g., current measurements) from protective devices on the other end of the transmission line. The device may use the independent channels of line current differential protection data to implement multiple independent differential protection functions for two or more power line segments.

22 Claims, 6 Drawing Sheets

(56) References Cited

U.S. PATENT DOCUMENTS

| | | | |
|---|---|---|---|
| 5,671,112 A | 9/1997 | Hu | |
| 5,694,281 A | 12/1997 | Roberts | |
| 5,703,745 A | 12/1997 | Roberts | |
| 5,731,943 A | 3/1998 | Roberts | |
| 5,793,750 A | 8/1998 | Schweitzer | |
| 5,805,395 A | 9/1998 | Hu | |
| 5,943,381 A | 8/1999 | Zampetti | |
| 5,963,404 A | 10/1999 | Guzman | |
| 6,028,754 A | 2/2000 | Guzman | |
| 6,115,825 A | 9/2000 | Laforge | |
| 6,236,949 B1 | 5/2001 | Hart | |
| 6,256,592 B1 | 7/2001 | Roberts | |
| 6,265,881 B1 | 7/2001 | Meliopoulos | |
| 6,341,055 B1 | 1/2002 | Guzman | |
| 6,356,127 B1 | 3/2002 | Klipper | |
| 6,356,421 B1 | 3/2002 | Guzman-Casillas | |
| 6,411,865 B1 | 6/2002 | Qin | |
| 6,442,010 B1 | 8/2002 | Kasztenny | |
| 6,446,682 B1 | 9/2002 | Viken | |
| 6,456,947 B1 | 9/2002 | Adamiak | |
| 6,518,767 B1 | 2/2003 | Roberts | |
| 6,525,543 B1 | 2/2003 | Roberts | |
| 6,590,397 B2 | 7/2003 | Roberts | |
| 6,603,298 B2 | 8/2003 | Guzman | |
| 6,608,742 B2 | 8/2003 | Schweitzer | |
| 6,662,124 B2 | 12/2003 | Schweitzer | |
| 6,757,146 B2 | 6/2004 | Benmouyal | |
| 6,839,210 B2 | 1/2005 | Roberts | |
| 6,845,333 B2 | 1/2005 | Anderson | |
| 6,879,917 B2 | 4/2005 | Turner | |
| 6,946,753 B2 | 9/2005 | Kernahan | |
| 7,002,784 B2 | 2/2006 | Wang | |
| 7,196,884 B2 | 3/2007 | Guzman | |
| 7,209,839 B2 | 4/2007 | Roytelman | |
| 7,272,201 B2 | 9/2007 | Whitehead | |
| 7,319,576 B2 | 1/2008 | Thompson | |
| 7,345,863 B2 | 3/2008 | Fischer | |
| 7,398,411 B2 | 7/2008 | Zweigle | |
| 7,425,778 B2 | 9/2008 | Labuschagne | |
| 7,472,026 B2 | 12/2008 | Premerlani | |
| 7,480,580 B2 | 1/2009 | Zweigle | |
| 7,502,696 B2 | 3/2009 | Moxley | |
| 7,570,469 B2 | 8/2009 | Guzman | |
| 7,582,986 B2 | 9/2009 | Folkers | |
| 7,630,863 B2 | 12/2009 | Zweigle | |
| 7,660,088 B2 | 2/2010 | Benmouyal | |
| 7,710,693 B2 | 5/2010 | Guzman | |
| 7,856,327 B2 | 12/2010 | Schweitzer | |
| 7,899,619 B2 | 3/2011 | Petras | |
| 8,154,836 B2 | 4/2012 | Kasztenny | |
| 8,405,944 B2 | 3/2013 | Donolo | |
| 8,559,146 B2* | 10/2013 | Kasztenny | H04J 3/0667 |
| | | | 361/87 |
| 11,909,194 B2† | 2/2024 | Gross | |
| 2001/0023464 A1 | 9/2001 | Deck | |
| 2004/0027748 A1 | 2/2004 | Kojovic | |
| 2004/0059469 A1 | 3/2004 | Hart | |
| 2004/0080884 A1* | 4/2004 | Roberts | H02H 7/22 |
| | | | 361/62 |
| 2005/0069025 A1 | 3/2005 | Kimura | |
| 2006/0224336 A1 | 10/2006 | Petras | |
| 2007/0030841 A1 | 2/2007 | Lee | |
| 2007/0070565 A1 | 3/2007 | Benmouyal | |
| 2007/0086134 A1 | 4/2007 | Zweigle | |
| 2008/0071482 A1 | 3/2008 | Zweigle | |
| 2008/0097694 A1 | 4/2008 | Petras | |
| 2008/0281540 A1 | 11/2008 | Zweigle | |
| 2009/0085407 A1 | 4/2009 | Venkatasubramanian | |
| 2009/0088989 A1 | 4/2009 | Guzman | |
| 2009/0088990 A1 | 4/2009 | Schweitzer | |
| 2009/0089608 A1 | 4/2009 | Guzman | |
| 2009/0091867 A1 | 4/2009 | Guzman-Casillas | |
| 2009/0099798 A1 | 4/2009 | Gong | |
| 2009/0125158 A1 | 5/2009 | Schweitzer | |
| 2009/0174976 A1* | 7/2009 | Saga | H02H 3/28 |
| | | | 361/65 |
| 2010/0002348 A1 | 1/2010 | Donolo | |
| 2010/0114390 A1 | 5/2010 | Stevenson | |
| 2011/0135047 A1 | 6/2011 | Tournier | |
| 2011/0170220 A1* | 7/2011 | Iinuma | H02H 3/066 |
| | | | 361/71 |
| 2014/0114731 A1* | 4/2014 | Wright | H04J 3/0661 |
| | | | 705/12 |
| 2017/0365992 A1* | 12/2017 | Shin | H02H 3/05 |
| 2018/0089057 A1* | 3/2018 | Yang | H04L 45/70 |
| 2023/0170685 A1 | 6/2023 | Donolo | |

OTHER PUBLICATIONS

Demetrious A. Tziouvaras, Jeff Roberts, Gabriel Benmouyal, Schweitzer Engineering Laboratories, Inc., New Multi-Ended Fault Location Design for Two- or Three-Terminal Lines, Nov. 1, 2004.

Gabriel Benmouyal, Schweitzer Engineering Laboratories, Inc., The Trajectories of Line Current Differential Faults in the Alpha Plane, Sep. 22, 2005.

Gabriel Benmouyal, Joe B. Mooney, Schweitzer Engineering Laboratories, Inc., Advanced Sequence Elements for Line Current Differential Protection, 2006.

GE Industrial Systems L90, Line Current Differential System, UR Series Instruction Manual, Section 8, Manual P/N:1601-0081-T1(GEK-113488) L90 Revision 5.6x2008, Section 8.

Steven Hodder, Bogdan Kasztenny, Normann Fischer "Backup Considerations for Line Current Differential Protection", 2012 IEEE, Originally presented at the 65th Annual Conference for Protective Relay Engineers, Apr. 2012.

Bogdan Kasztenny, Normann Fischer, Ken Fodero, Adrian Zvarych "Communications and Data Synchronization for Line Current Differential Schemes," Originally published in the proceedings of the 2nd Annual Protection, Automation and Control World Conference, Jun. 2011.

Hank Miller, John Burger, Normann Fischer, Bogdan Kasztenny "Modern Line Current Differntial Protection Solutions," Originally presented at the 36th Annual Western Protective Relay Conference, Oct. 2009.

Edmund O. Schweitzer III, David Whitehead, Hector J. Altuve Ferrer, Demetrious A. Tziouvaras, David A. Costello, David Sanchez Escobedo "Line Protection: Redundancy, Reliability, and Affordability," 2011 IEEE, Originally presented at the 37th Annual Western Protective Relay Conference, Oct. 2010.

\* cited by examiner

† cited by third party

PROTECTIVE DEVICE WITH MULTI-CHANNEL LINE CURRENT DIFFERENTIAL PROTECTION

TECHNICAL FIELD

This disclosure relates to power line protection systems. Specific aspects of this disclosure relate to differential protection systems for transmission lines, including three-phase power transmission lines, zone interlocking communication schemes, and recloser controllers in distribution power lines.

BRIEF DESCRIPTION OF THE DRAWINGS

The written disclosure herein describes illustrative embodiments and examples that are nonlimiting and non-exhaustive. This disclosure references some of these embodiments, as depicted in the figures described below.

DETAILED DESCRIPTION

Figure 1:
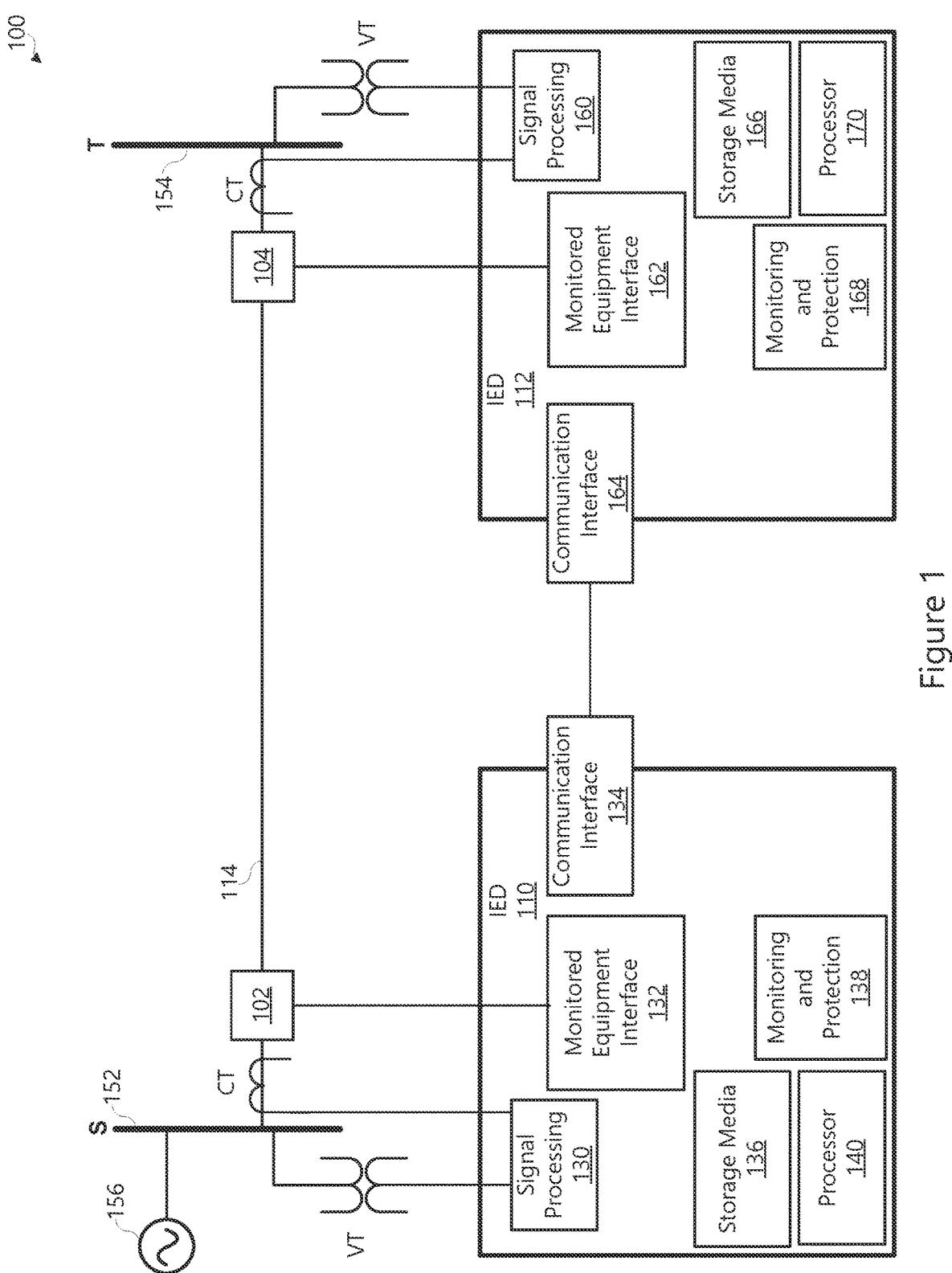
FIG. 1 illustrates a one-line diagram of an electrical power delivery system with Intelligent Electronic Devices (IEDs) implementing differential protection of a power line, according to one embodiment.

Intelligent electronic devices (IEDs) are used to monitor, protect, and/or control various aspects of electric power delivery systems. IEDs obtain electrical measurements, such as voltage measurements and/or current measurements, from the power system and use those measurements to determine a condition of the power system. IEDs may perform a protective action (such as signaling a circuit breaker to trip) under certain determined conditions. An IED may be embodied as (or include a subsystem of hardware and/or software components that function as) a device traditionally referred to as a relay, a protective device, a meter, a controller, or a network communication device. As used herein, the term IED includes but is not limited to, micro-processor-based devices that operate to monitor, control, automate, and/or protect equipment within a power system. An IED may further include communication interfaces for communicating via one or more networks using any of a wide variety of communication protocols.

According to various embodiments described herein, an IED includes, is embodied as, and/or implements functions of a protective device, such as a line current differential protection relay. Differential protection operates based on a difference between measured current values at two different locations within a power system. For example, line current differential protection may be implemented by protective devices acting on measured current values obtained from two different ends of a transmission line or distribution line. As used herein, the term "line" (such as power line, transmission line, or distribution line) may be used to refer to any of a wide variety of electrical conductors used for power delivery. The singular term "power line" is also used herein to encompass a three-phase power line with three phase lines (e.g., phase A, phase B, and phase C) in a delta or wye configuration.

The presently described systems and methods allow for a single IED (e.g., a single relay or single protective device) to monitor and provide differential protection to more than one power line. As described herein, a protective device with multi-channel line current differential protection provides additional security from data corruption and/or single event upsets (SEUs). In some embodiments and applications, this may reduce the cost of overall protection and/or increase protection scheme dependability.

According to various embodiments, each IED in a multi-channel line current differential protection architecture includes multiple communication channels to simultaneously receive independent differential data (e.g., current measurements) from IEDs on the other end of a protected power line segment. The IED may use the independent channels of line current differential protection data to implement an internal voting scheme to make protection decisions based on the independently received protection data. Each IED in the system may implement two or more independent line differential protection functions (e.g., ANSI 87L functions). The concept of differential protection may be implemented as described herein in accordance with well-understood principles of differential protection, principles described in the context of the ANSI 87L functions, and existing publications and scholarly articles related to differential protection. An example of such a publication is U.S. Pat. No. 6,518,767, granted on Feb. 11, 2003, titled "Line Differential Protection System for a Power Transmission Line," which application is hereby incorporated by reference in its entirety.

According to various embodiments, an IED may provide multi-channel differential protection to a first power line segment and a second power line segment. The IED may include a local sensor subsystem to obtain local current measurement data for the first end of the first power line segment and the first end of the second power line segment. The local sensor subsystem may, for example, include a current transformer (CT) and/or an analog-to-digital converter (ADC). In another embodiment, the local sensor subsystem may include a communication interface to receive digital current measurement data from a merging unit connected to a current transformer (CT) device.

The IED may operate to provide differential protection functions for first and second power line segments that are, for example, sequential segments of a distribution power line. In other embodiments, the first and second power line segments may be adjacent transmission lines whose first ends are located proximate to one another (e.g., in a first substation) and whose second ends are located proximate to one another (e.g., in a second substation).

The IED may include a communication interface to receive remote current measurement data for the second end of the first power line segment from a first remote IED (e.g., positioned proximate to or local to the second end of the first power line segment). The communication interface of the IED may also receive remote current measurement data for the second end of the second power line segment from a second remote IED (e.g., positioned proximate to or local to the second end of the second power line segment).

The IED may include two distinct and independent differential protection subsystems. The first differential protection subsystem may operate to detect a fault condition based on a comparison of the local current measurement data for the first end of the first power line segment and the remote current measurement data for the second end of the first power line segment from the first remote IED. The second differential protection subsystem may operate to detect a fault condition based on a comparison of the local current measurement data for the first end of the second power line segment and the remote current measurement data for the second end of the second power line segment from the second remote IED.

The IED may include a protection subsystem operable to implement a protective action (e.g., trip or open a breaker) on the first power line segment in response to fault detection by the first differential protection subsystem. The protection subsystem may also be operable to implement a protective action on the second power line segment in response to fault detection by the second differential protection subsystem. The IED may additionally or alternatively provide a notification or alert in response to fault detection on one or both of the first and second power line segments.

In some examples, the IED also receives remote current measurement data for the second end of the first power line segment from the second remote IED. The IED may compare the remote current measurement data for the second ends of the first power line segment. Data from one of the remote IEDs may be corrupted or missing. The IED may utilize internal decisional logic to select between the remote current measurement data for the second end of the first power line segment provided by the first and second remote IEDs.

In various embodiments, the IED may include more than two differential protection subsystems to simultaneously and independently detect fault conditions associated with any number of power lines. For example, the IED may further include a third differential protection subsystem to detect a fault condition based on a comparison of local current measurement data for a first end of a third power line segment and remote current measurement data for the second end of the third power line segment provided by a third remote IED.

Various possible differential protection architectures are possible using the multi-channel line current protective devices described herein. For example, a set of local, multi-channel line current protective devices may be used to implement overlapping (e.g., coordinated) protection of any number of power lines in conjunction with a corresponding set of remote, multi-channel line current protective devices. Coordination between local protective devices may include the use of voting schemes to determine if protective actions should be taken and/or if received data is valid or corrupted. Coordination between local protective devices may additionally or alternatively include the exchanging of heartbeat statuses, sharing or comparing locally obtained measurement data, and sharing or comparing remote measurement data from remote IEDs.

For example, one or more of the IEDs may implement a voting scheme that is applicable to multiple independent differential channels to implement multiple independent differential elements that are protecting the same line. For example, an IED may compare the outcome or decision based on each differential element to ensure that all or a majority of the differential elements within a single IED (or within multiple IEDs) are making the same decision. When an IED includes multiple independent differential elements, the IED implements an internal voting scheme within the single IED based on the outcome or decision made by the different differential elements.

One example implementation would be to use two independent differential channels to AND their outputs together before declaring a fault condition. In this voting scheme, both differential channels must agree before a fault condition is declared (determined, acted upon, reported, etc.) Another example would be to utilize a two-out-of-three voting scheme. The implementation of this would be to use the data from three differential elements to ensure that two of the three elements declare a fault condition. If all differential elements are available (not in an error condition) and they do not declare a fault condition, the differential operation is blocked. The voting prevents the IED from operating on erroneous data in the differential packet adding security to the overall scheme.

As previously described, each of the first and second power line segments may be embodied as a three-phase power line segment. In such embodiments, each independent differential protection subsystem may include phase-segregated measurements and comparisons for each phase of each power line segment. The protection subsystem may be operable to implement single-pole tripping of a breaker in response to a fault detection on one phase line.

As previously described, the first power line segment and the second power line segment may be sequential segments of a single distribution power line (e.g., a single three-phase distribution power line). In such an embodiment, IED may be positioned between the first and second remote IEDs. That is, the first remote IED may be positioned in a first direction along the distribution power line, and the second remote IED may be positioned in a second direction along the distribution power line.

As noted above, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated into an IED or be in communication with an IED.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order or even sequentially, nor need the steps be executed only once unless otherwise specified.

Several aspects of the embodiments described may be implemented as software modules, hardware components, and/or combinations thereof. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions. Software modules or components may comprise disparate instructions stored in different locations of a memory device, which together implement the described functionality of the module. Indeed, a module or component may comprise a single instruction or many instructions and may be distributed over several different code segments, among different programs, and across several memory devices. Some embodiments may be practiced in a distributed computing environment.

FIG. 1 illustrates a one-line diagram of an electric power delivery system 100 fed by source 156 at terminal S 152 with a power line 114 (e.g., a transmission line or a distribution line) to a terminal T 154. A local IED 110 (e.g., local with respect to terminal S 152) monitors the power line 114 via a current transformer (CT) to obtain current measurements and/or a voltage transformer (VT) to obtain voltage measurements proximate to the first end of the power line 114 (e.g., the end local to the local IED 110). The illustrated drawing is not drawn to scale, and the distance between terminal S 152 and terminal T 154 may be a long distance (e.g., multiple kilometers). The system may include various other lines, branches, transformers, loads, and the like, but it is illustrated in simplified form for ease of discussion herein.

A remote IED 112 is positioned proximate to the terminal T 154 (e.g., local with respect to the terminal T 154). The remote IED 112 monitors the power line 114 via a current transformer (CT) to obtain current measurements and/or a voltage transformer (VT) to obtain voltage measurements proximate to the second end of the power line 114 proximate to the terminal T 154 (e.g., the end local to the remote IED 112).

Each of the IEDs 110 and 112 may provide electric power system protection such as differential protection, distance protection, overcurrent protection, and/or the like. Each IED 110 and 112 includes a processor 140 and 170 for executing computer instructions, which may comprise one or more general purpose processors, special purposes processors, application-specific integrated circuits, programmable logic elements (e.g., FPGAs), or the like. Each IED 110 and 112 may further comprise non-transitory machine-readable storage media 136 and 166, which may include one or more disks, solid-state storage (e.g., Flash memory), optical media, or the like for storing computer instructions, measurements, settings, and the like. In various embodiments, the storage media 136 and 166 may be packaged with the processors 140 and 170, separate from the processors 140 and 170, or there may be multiple physical storage media 136 and 166, including media packaged with the processors 140 and 170 and media 136 and 166 separate from the processor 140 and 170.

The IEDs 110 and 112 may be communicatively coupled to each other via the communication interfaces 134 and 164 and/or other IEDs or supervisory systems either directly or using one or more communication networks. In some embodiments, the IEDs 110 and 112 may include human-machine interface (HMI) components (not shown), such as a display, input devices, and so on. The IEDs 110 and 112 may include a plurality of monitoring and protection elements, described as monitoring and protection modules 138 and 168 that may be embodied as instructions stored on computer-readable media, hardware components, circuit components, and/or the like. The monitoring and protection module 138 of IED 110 may implement differential protection using the local current measurements from the CT provided via the signal processor 130 and remote current measurements provided by the IED 112 via the communication interface 134.

Similarly, the monitoring and protection module 168 of IED 110 may implement differential protection using the local current measurements from the CT provided via the signal processor 160 and remote current measurements provided by the IED 110 via the communication interface 164. In response to a detected fault, the IED 110 may trip (open) the circuit breaker 102 via the monitored equipment interface 132. In response to a detected fault, the IED 112 may trip the circuit breaker 104 via the monitored equipment interface 162.

Figure 2:
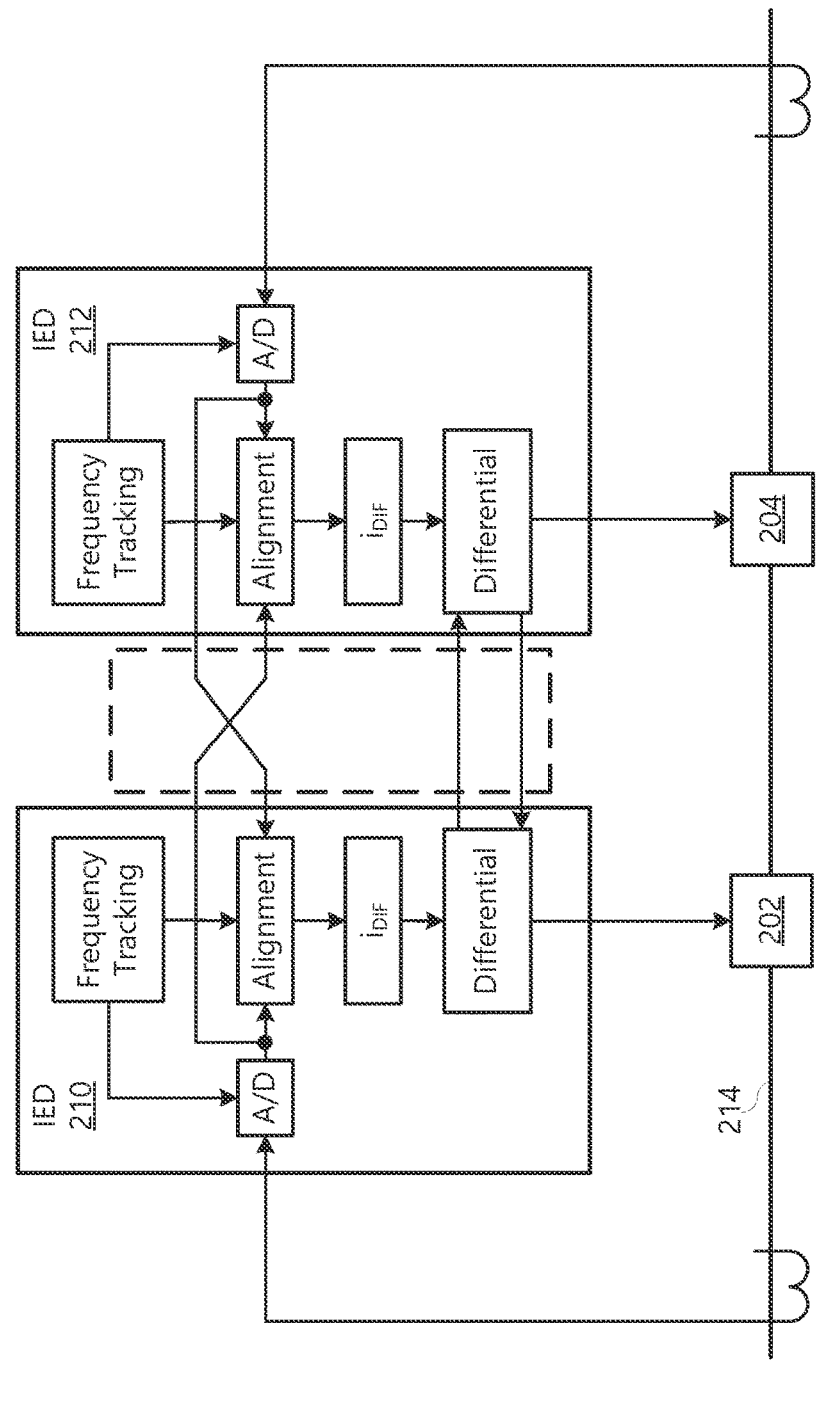
FIG. 2 illustrates a simplified block diagram of differential protection subsystems within IEDs operating to implement differential protection of a power line, according to one embodiment.

FIG. 2 illustrates a simplified block diagram 200 of differential protection subsystems within IEDs 210 and 212 operating to implement differential protection of a power line 214, according to one embodiment. As illustrated, the first IED 210 receives CT data for the first end of the power line 214 via an analog-to-digital converter. The second IED 212 receives CT data for a second end of the power line 214 via an analog-to-digital converter.

The first IED 210 transmits the CT data for the first end of the power line 214 to the second IED 212, and the second IED 212 transmits the CT data for the second end of the power line 214 to the first IED 210. Each of the IEDs 210 and 212 may, for example, use frequency tracking to align the CT data from the first and second ends of the power line 214 and identify one or more fault conditions using line differential protection functions. The first and second IEDs 210 and 212 may, in response to a detected fault condition may coordinate to open one or both of the breakers 202 and 204 to protect a segment of the power line 214.

Figure 3A:
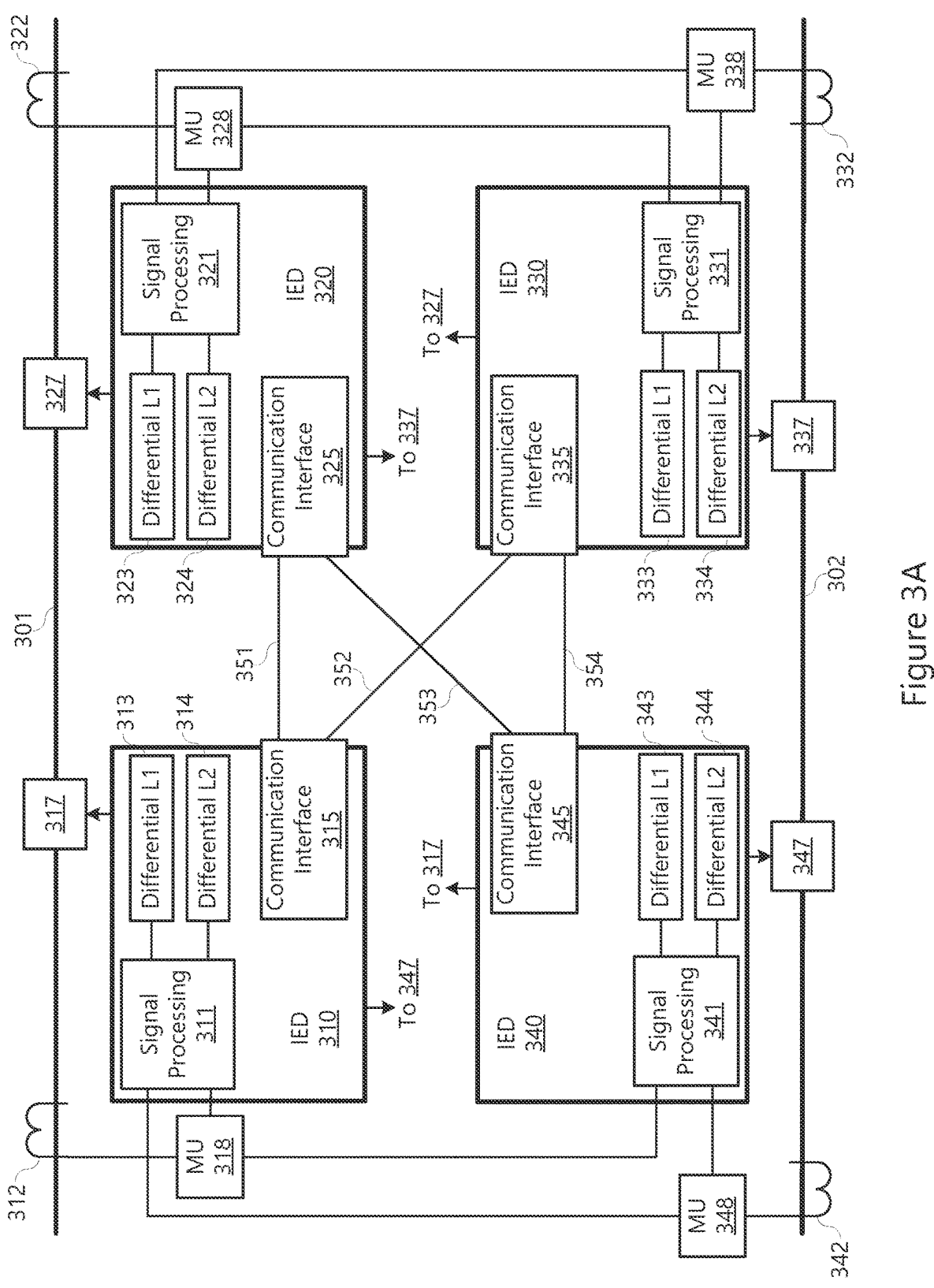
FIG. 3A illustrates a block diagram of a differential protection architecture in which each IED provides differential protection to multiple lines, according to one embodiment.
Figure 3B:
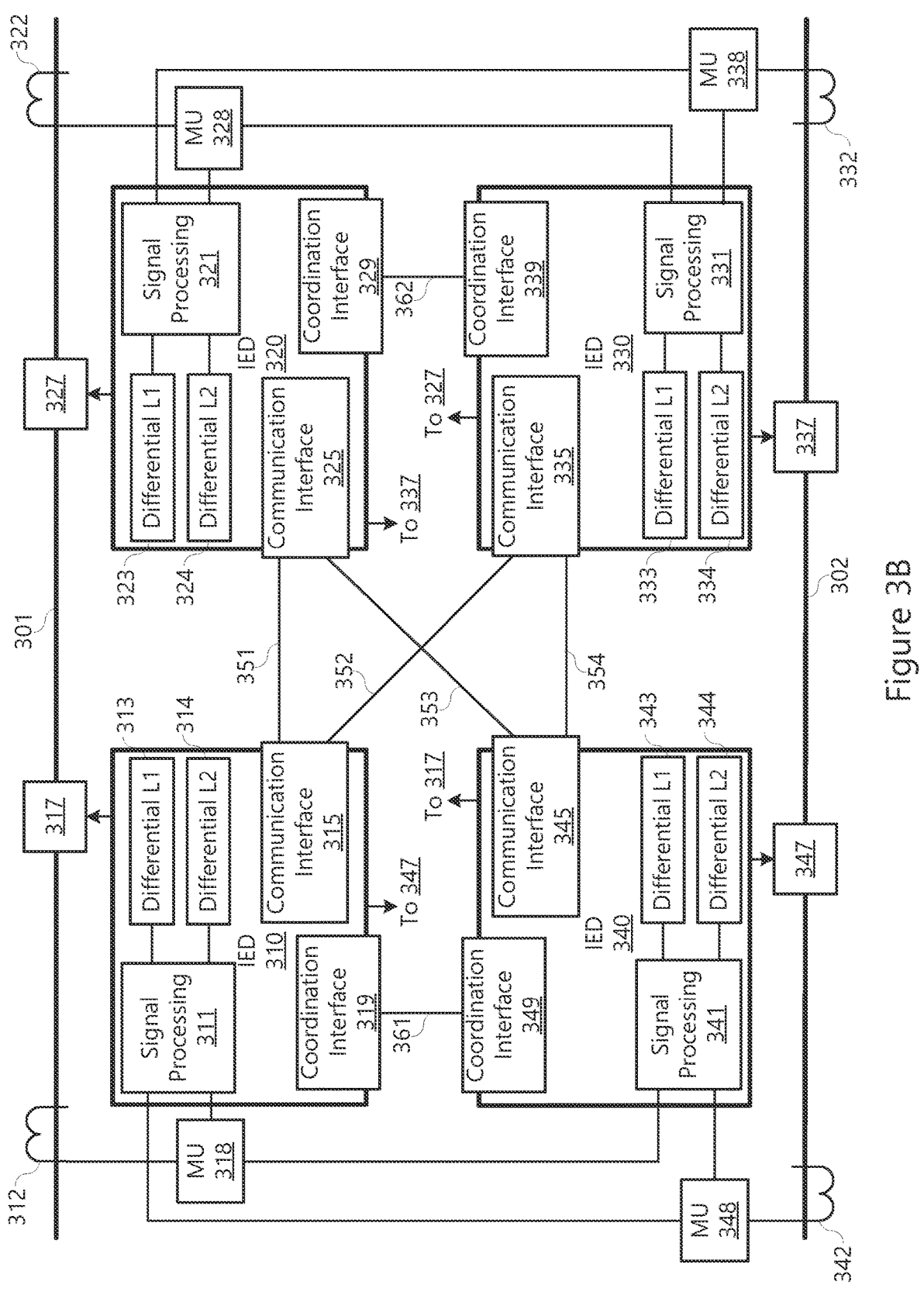
FIG. 3B illustrates a block diagram of the multi-channel line current differential protection architecture in which local IEDs implement external decision logic via a local communication channel, according to one embodiment.

FIGS. 3A and 3B illustrate block diagrams of a differential protection architecture in which each IED provides differential protection to multiple lines, according to various embodiments. The term "local" is used to describe the IEDs 310 and 340 on the left sides of FIGS. 3A and 3B, and the term "remote" is used to describe the IEDs 320 and 330 on the right sides of FIGS. 3A and 3B. However, the terms "local" and "remote" are relative terms that are interchangeable based on the perspective from which various functions and interactions are described. FIGS. 3A and 3B are described herein from a perspective in which the IED 310 is referred to as "the first local IED," the IED 320 is referred to as "the first remote IED," the IED 330 is referred to as "the second remote IED," and the IED 340 is referred to as "the second local remote IED."

As illustrated in FIG. 3A, the first local IED 310 is located at a first end of a first transmission line 301 (e.g., a segment of the transmission line). The first local IED 310 includes a signal processing module 311 to obtain digital current measurement data from a merging unit 318 connected to a CT 312 on the first end of the first transmission line 301. The signal processing module 311 also obtains digital current measurement data from a merging unit 348 connected to a CT 342 on the first end of a second transmission line 302.

The first remote IED 320 includes a signal processing module 321 to obtain digital current measurement data from a merging unit 328 connected to a CT 322 on the first end of the second transmission line 301. The signal processing module 321 also obtains digital current measurement data from a merging unit 338 connected to a CT 332 on the second end of the second transmission line 302.

The second remote IED 330 includes a signal processing module 331 to obtain digital current measurement data from the merging unit 338 connected to the CT 332 on the second end of the second transmission line 302. The signal processing module 331 also obtains digital current measurement data from the merging unit 328 connected to the CT 322 on the second end of the first transmission line 301.

The second local IED 340 is positioned proximate to the first end of the second transmission line 302. The second local IED 340 includes a signal processing module 341 to obtain digital current measurement data from the merging unit 348 connected to the CT 342 on the first end of the second transmission line 302. The signal processing module 341 also obtains digital current measurement data from the merging unit 318 connected to the CT 312 on the first end of the first transmission line 301.

The first local IED 310 includes a communication interface 315 to receive current measurement data for the second end of the first transmission line 301 from the first remote IED 320. The communication interface 315 of the first local IED 310 is connected to the communication interface 325 of the first remote IED 320 via a communication line 351 (e.g., direct link, public network, or private network).

The communication interface 315 of the first local IED 310 also receives current measurement data for the second end of the second transmission line 302 from the second remote IED 330. As illustrated, the communication interface 315 of the first local IED 310 is connected to the communication interface 335 of the second remote IED 330 via a communication line 352.

In some embodiments, the first local IED 310 may also receive the current measurement data for the second end of the second transmission line 302 from the first remote IED 320 and/or the current measurement data for the second end of the first transmission line 301 from the second remote IED 330. In such embodiments, the first IED 310 receives current measurement data for the second ends of the first and second transmission lines 301 and 302 in duplicate (i.e., from each of the first and second remote IEDs 320 and 330). The first IED 310 may implement an internal voting scheme via decision logic (e.g., circuitry and/or software algorithms) to harmonize conflicts in the data, identify and discard corrupt data, and/or otherwise select between the different data sets.

The first local IED 310 includes a first differential protection subsystem 313 to implement a differential protection function on the first transmission line 301 based on the current measurement data for the first and second ends of the first transmission line 301. The first local IED 310 includes a second differential protection subsystem 314 to implement a differential protection function on the second transmission line 302 based on the current measurement data for the first and second ends of the second transmission line 302.

The first local IED 310 includes a protection subsystem (not shown) to implement protective actions in response to the detection of a fault on the first or second transmission lines 301 or 302. For example, the first local IED 310 may open a breaker 317 in response to a fault detected on the first transmission line 301 and/or open a breaker 347 in response to a fault detected on the second transmission line 302. The first local IED 310 may coordinate protection with the first and second IEDs 320 and 330 to open the breakers 327 and 337 in response to detected faults on the first and second transmission lines 301 and 302, respectively.

In some embodiments, the protective action may additionally or alternatively include an alarm or notification. In embodiments in which the first and second transmission lines 301 and 302 are three-phase power transmission lines, each of the first and second differential protection subsystems 313 and 314 may comprise a differential relay device with phase-segregated measurements for each phase. The first local IED 310 may implement a protective action by opening a single-pole breaker of one phase line detected to be in a fault condition, such that the other phase lines (e.g., the non-faulted phase lines) can continue to operate.

The functionality of each of the first remote IED 320, the second remote IED 330, and the second local IED 340 may be the same as the functionality described above in the context of the first local IED 310. However, for completeness, the functionality of each of the first remote IED 320, the second remote IED 330, and the second local IED 340 is detailed below. As described herein, each of the first local IED 310, the first remote IED 320, the second remote IED 330, and the second local IED 340 operates to provide differential protection to both the first transmission line 301 and the second transmission line 302. Each IED provides multiple-channel, simultaneous line current differential protection and is in communication with multiple "remote" IEDs.

The first remote IED 320 receives current measurement data for the first end of the first transmission line 301 from the first local IED 310 and current measurement data for the first end of the second transmission line 302 from the second local IED 340 via the communication interface 325. As illustrated, the communication interface 325 of the first remote IED 320 is connected to the communication interface 345 of the second local IED 340 via a communication line 353. The first remote IED 320 includes a first differential protection subsystem 323 to implement a differential protection function on the first transmission line 301 based on the current measurement data for the first and second ends of the first transmission line 301. The first remote IED 320 includes a second differential protection subsystem 324 to implement a differential protection function on the second transmission line 302 based on the current measurement data for the first and second ends of the second transmission line 302.

The first remote IED 320 includes a protection subsystem (not shown) to implement protective actions, such as tripping breakers 327 and/or 337, in response to the detection of a fault on the first or second transmission lines 301 or 302, respectively. As described herein, the IEDs 310, 320, 330, and 340 may coordinate protective actions when opening breakers and/or implement voting schemes to determine whether a breaker or breakers should be opened, as understood in the art and implemented in the context of single channel line current differential protection architectures in which each line is associated with exactly two differential protection devices (e.g., ANSI 87L devices).

The second remote IED 330 receives current measurement data for the first end of the first transmission line 301 from the first local IED 310 and current measurement data for the first end of the second transmission line 302 from the second local IED 340 via the communication interface 335. As illustrated, the communication interface 335 of the second remote IED 330 is connected to the communication interface 345 of the second local IED 340 via a communication line 354. The second remote IED 330 includes a first differential protection subsystem 333 to implement a differential protection function on the first transmission line 301 based on the current measurement data for the first and second ends of the first transmission line 301. The second remote IED 330 includes a second differential protection subsystem 334 to implement a differential protection function on the second transmission line 302 based on the current measurement data for the first and second ends of the second transmission line 302.

The second remote IED 330 includes a protection subsystem (not shown) to implement protective actions, such as tripping breakers 327 and/or 337, in response to the detection of a fault on the first or second transmission lines 301 or 302, respectively. As previously described, any protective action or fault detection performed by the second remote IED 330 may be done in coordination with the first and second local IEDs 310 and 340.

The second local IED 340 receives current measurement data for the second end of the first transmission line 301 from the second remote IED 320 and current measurement data for the second end of the second transmission line 302 from the second remote IED 330, via the communication interface 345. The second local IED 340 includes a first differential protection subsystem 343 to implement a differential protection function on the first transmission line 301 based on the current measurement data for the first and second ends of the first transmission line 301. The second remote IED 330 includes a second differential protection subsystem 344 to implement a differential protection function on the second transmission line 302 based on the current measurement data for the first and second ends of the second transmission line 302.

The second local IED 340 includes a protection subsystem (not shown) to implement protective actions, such as tripping breakers 317 and/or 347, in response to the detection of a fault on the first or second transmission lines 301 or 302, respectively. As previously described, protective actions and/or fault detection performed by the second local IED 340 may be done in coordination with the first and second remote IEDs 320 and 330.

According to various embodiments, the communication lines 351, 352, 353, and 354 may be embodied as independent network links or as part of a single communication network. The communication lines 351, 352, 353, and 354 may be, for example, fiber optical communication lines, utilize a satellite-based communication network, employ point-to-point radio communications, and/or utilize various wireless communication networks. According to various embodiments, the first and second local IEDs 310 and 340 may be physically located proximate to the first ends of the first and second transmission lines 301 and 302. For example, the first and second local IEDs 310 and 340 and the first ends of the first and second transmission lines 301 and 302 may be located within a first substation. Similarly, the first and second remote IEDs 320 and 330 and the second ends of the first and second transmission lines 301 and 302 may be, for example, located within a second substation. The protected segments of the first and second transmission lines, respectively, may extend for tens, hundreds, or even thousands of kilometers between the first and second substations.

FIG. 3B illustrates a block diagram of the multi-channel line current differential protection architecture in which local IEDs implement external decision logic via a local communication channel, according to one embodiment. FIG. 3B differs from FIG. 3A in that each of the IEDs 310,

320, 330, and 340 includes a coordination interface 319, 329, 339, and 349, respectively, that facilitates local coordination of data verification, data processing, fault detection, and/or protective actions. The local coordination may include decision logic in the form of various hardware-based and/or software-based voting schemes and/or redundancy checks.

By way of example, and as previously described, the first local IED 310 may provide differential protection of first transmission line 301 based on local current measurement data for the first end of the first transmission line 301 obtained from the merging unit 318 (or alternatively directly from the CT 312) and remote current measurement data for the second end of the first transmission line 301 received from the first and/or second remote IEDs 320 and 330. The first local IED 310 may coordinate fault detection and/or protective actions (e.g., implement a voting scheme) with the first and/or second remote IEDs 320 and 330 via the communication lines 351 and 352. The illustrated embodiment utilizes merging units 318, 328, 338, and 348 to obtain current measurement data. In alternative embodiments, electrical measurement data (e.g., current measurements, voltage measurements, etc.) may be obtained using merging units, using direct-connected or hardwired sensors, and/or a combination thereof.

As illustrated in FIG. 3B, the coordination interface 319 of the first local IED 310 is connected to the coordination interface 349 of the second local IED 340 via a communication line 361. The first and second local IEDs 310 and 340 may coordinate fault detection and/or protective actions (e.g., implement a voting scheme). For example, the first and second local IEDs 310 and 340 may coordinate the actuation of the breaker 317 on the first transmission line 301 and the actuation of the breaker 347 on the second transmission line 302. Similarly, the first and second remote IEDs 320 and 330 may coordinate fault detection and/or protective actions via the communication line 362 connecting their respective coordination interfaces 329 and 339.

In various embodiments, the first local IED 310 may provide primary differential protection to the first transmission line 301 and backup differential protection to the second transmission line 302. The second local IED 340 may provide primary differential protection to the second transmission line 302 and backup differential protection to the first transmission line 301. For example, if the first local IED 310 loses connection or otherwise fails, the second local IED 340 may act as a backup to coordinate differential protection of the first transmission line 301 with the first remote IED 320 and, in response to a detected fault, implement a protective action by opening breaker 317.

Figure 4:
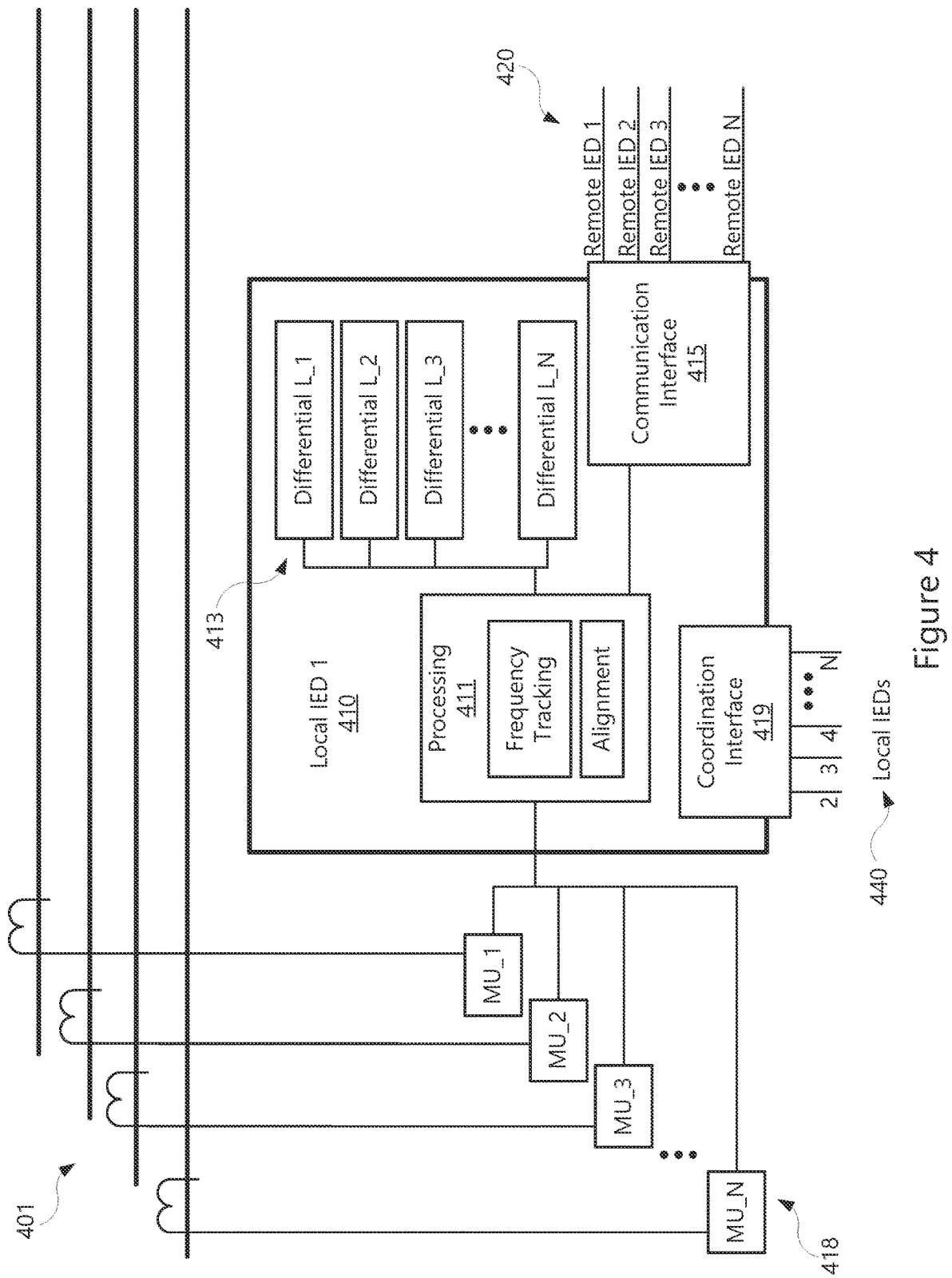
FIG. 4 illustrates a simplified block diagram of an IED configured to provide multi-channel differential protection to N adjacent transmission lines, where N is an integer, according to one embodiment.

FIG. 4 illustrates a simplified block diagram of an IED 410 configured to provide multi-channel differential protection to N adjacent transmission lines 401, where N is an integer, according to one embodiment. The IED 410 is described from the perspective in which the IED 410 is the "first local IED" in a protection architecture in which a set of N local IEDs 440 are used in combination with N remote IEDs 420 to provide differential protection to the N transmission lines 401, again where N is an integer value.

As illustrated, a plurality of merging units 418 (e.g., N merging units) operate to digitize local current measurement data collected by CTs on the N adjacent transmission lines 401. The digital local current measurement data is provided by the plurality of merging units 418 to a processing module 411 of the first local IED 410. A communication interface 415 of the first local IED receives remote current measurement data from a second end of each of the N transmission lines 401 from each of a plurality of remote IEDs 420 (e.g., N remote IEDs). The processing module 411 includes various frequency tracking and/or alignment functions to synchronize the local and remote current measurement data for each of the N transmission lines 401.

The first local IED 410 includes N distinct and independent differential protection subsystems 413. Each of the N distinct and independent differential protection subsystems 413 is associated with one of the N transmission lines 401. The first local IED 410 may operate to provide primary differential protection to a first of the N transmission lines 401 via a first of the N differential protection subsystems 413. In various embodiments, the first local IED 410 may provide the primary differential protection of the first of the N transmission lines 401 in coordination with a first remote IED of the plurality of remote IEDs 420. The first local IED 410 may provide backup differential protection and/or participate in a voting scheme for differential protection of the other transmission lines 401 via the other differential protection subsystems 413, optionally in coordination with some or all the remote IEDs 420 and/or in coordination with some or all of the local IEDs 440 via the coordination interface 419.

In the embodiments described above, N transmission lines are protected with N local IEDs 410 and 440 and N remote IEDs 420, each of which includes N independent differential protection subsystems. In such embodiments, a voting scheme may be implemented in which all IEDs participate in the differential protection fault detection and/or protective actions and/or N–1 levels of backup redundancy are provided to each of the N transmission lines. In other embodiments, N–x local IEDs and N–y remote IEDs may be used to provide differential protection to N transmission lines, where x and y are integer values less than N (where x and y may be the same or different). In such embodiments, independent differential protection is provided to each of the N transmission lines as long as the number of differential protection subsystems in the N–x local IEDs is equal to N and the number of differential protection subsystems in the N–y remote IEDs is equal to N.

Figure 5:
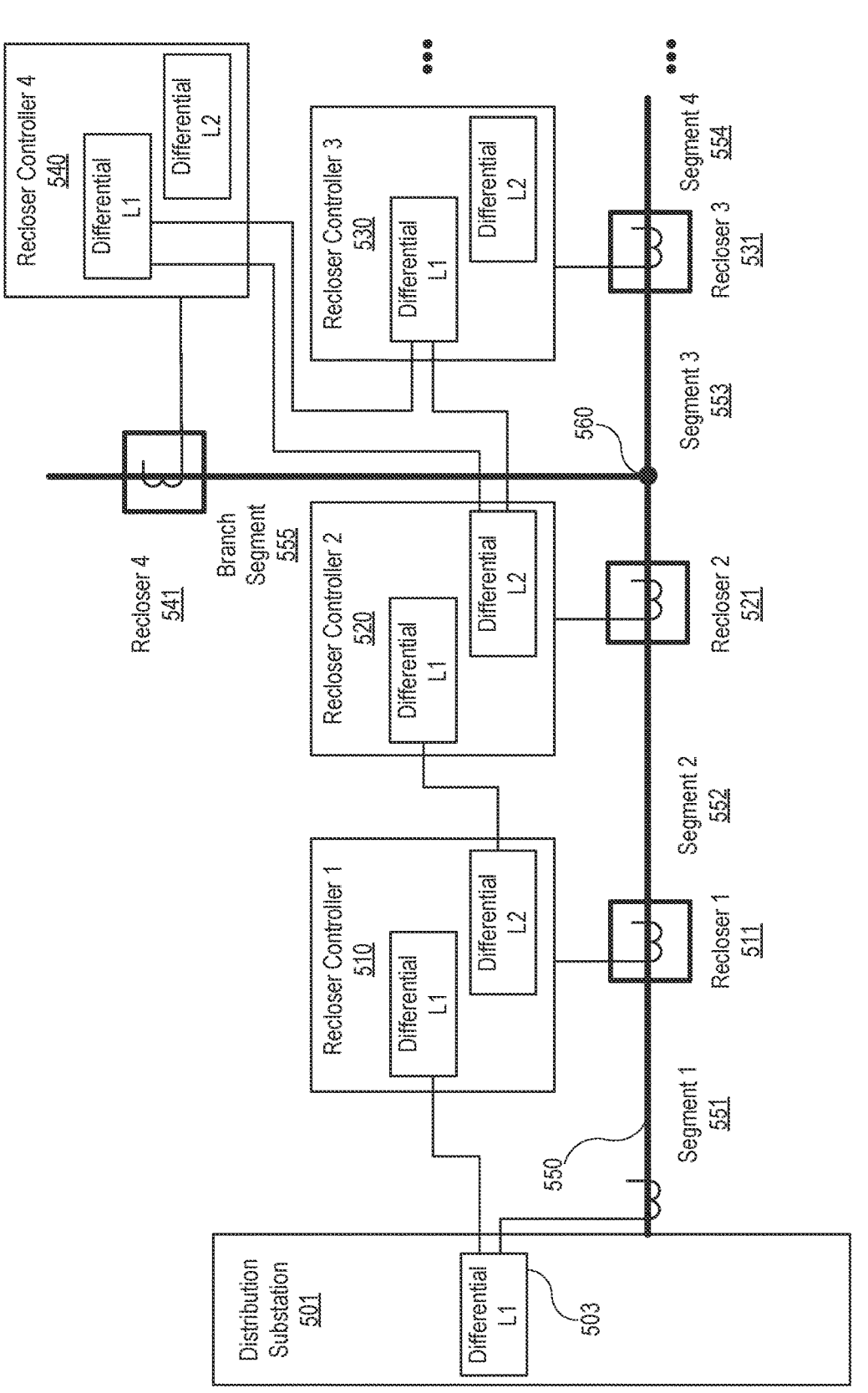
FIG. 5 illustrates a block diagram of a differential protection architecture in which each IED provides differential protection to two sequential segments of a distribution power line, according to one embodiment.

FIG. 5 illustrates a block diagram of a differential protection architecture in which the IEDs (operating as recloser controllers) 510, 520, 530, and 540 provide differential protection to various segments of a distribution power line 550, according to various embodiments. The recloser controllers 510, 520, 530, and 540 control the operation of the first recloser 511, second recloser 521, third recloser 531, and fourth recloser 541, respectively. Current measurements are obtained at the first end of the first segment 551 of the distribution power line 550 (e.g., at 503). The first recloser controller 510 obtains current measurements at the second end of the first segment 551 of the distribution power line 550 and obtains current measurements at the first end of the second segment 552 of the distribution power line 550. The second recloser controller 520 obtains current measurements at the second end of the second segment 552 of the distribution power line 550. The second recloser controller 520 also obtains current measurements at the first end of the third segment 553 to the left of the junction 560 in the distribution power line 550. The third recloser controller 530 obtains current measurements at the second end of the third segment 553 to the right of the junction 560 in the distribution power line 550. The third recloser controller 530 may also obtain current measurements at a first end of a fourth segment 554 of the distribution power line 550. The fourth recloser controller 540 obtains current measurements at the end of the branch segment 555 of the distribution power line 550.

Any number of additional recloser controllers may be utilized to provide differential protection to any number of additional segments of the distribution power line 550.

The first recloser controller 510 receives the current measurements from the first end of the first segment 551 and also receives the current measurements from the second end of the second segment 552 from the second recloser controller 520. The second recloser controller 520 receives current measurements for the first end of the second segment 552 from the first recloser controller 510, current measurements for the second end of the third segment 553 from the third recloser controller 530, and current measurements for the end of the branch segment 555 from the fourth recloser controller 540. The third recloser controller 530 receives the current measurements for the first end of the third segment 553 from the second recloser controller 520 and current measurements for the end of the branch segment 555 from the recloser controller 540. Though not illustrated, the third recloser controller 530 may also receive current measurements from additional recloser controllers, such as a fifth recloser controller (not shown) connected to the second end of the fourth segment 554. The fourth recloser controller 540 receives current measurements for the first end of the third segment 553 from the second recloser controller 520 and current measurements for the second end of the third segment 553 from the third recloser controller 530.

The first recloser controller 510 includes a first differential protection subsystem to provide differential protection of the first segment 551 via the first recloser 511 based on the current measurements of the first and second ends of the first segment 551. The first recloser controller 510 includes a second differential protection subsystem to provide differential protection of the second segment 552 via the first recloser 511 based on the current measurements of the first and second ends of the second segment 552.

The second recloser controller 520 includes a first differential protection subsystem to provide differential protection of the second segment 552 via the second recloser 521 based on the current measurements of the first and second ends of the second segment 552. The second recloser controller 520 includes a second differential protection subsystem to provide differential protection of the third segment 553 via the second recloser 521 based on the current measurements of the first and second ends of the third segment 553 and the end of the branch segment 555. The third recloser controller 530 includes a first differential protection subsystem to provide differential protection of the third segment 553 via the third recloser 531 based on the current measurements of the first and second ends of the third segment 553 and the end of the branch segment 555. The fourth recloser controller 540 includes a first differential protection subsystem to provide differential protection of the branch segment 555 via the fourth recloser 541 based on the current measurements of the first and second ends of the third segment 553 and the end of the branch segment 555.

The first, second, third, and fourth recloser controllers 510, 520, 530, and 540 may coordinate differential protection fault detection and protective actions. For example, the first, second, third, and fourth recloser controllers 510, 520, 530, and 540 may operate in a zone interlocking communication scheme. The illustrated differential protection architecture for the distribution power line (e.g., distribution feeder) includes four recloser controllers 510, 520, 530, and 540 and a differential protection subsystem 503 in the distribution substation 501 (which may also be embodied as an IED or recloser device).

The four recloser controllers 510, 520, 530, and 540 are configured to provide differential protection to three sequential segments 551, 552, and 553 and a branch segment 555 or "zones" of the distribution power line 550. However, it is appreciated that any number of additional recloser controllers may be used to provide differential protection to any number of additional segments or zones of the distribution power line 550. The illustrated example provides a simplified block diagram. It is, however, appreciated, that each line segment may include multiple recloser controllers, each line segment may include multiple reclosers, each recloser or each line segment may be associated with multiple wireless current sensors or merging units, and/or any number of taps/terminals may be utilized.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed:

1. An intelligent electronic device (IED) to provide multi-channel differential protection to a first power line segment and second power line segment, the IED comprising:

a local sensor subsystem to obtain:

local current measurement data for a first end of the first power line segment, and local current measurement data for a first end of the second power line segment;

a communication interface to receive:

remote current measurement data for a second end of the first power line segment from a first remote IED, and remote current measurement data for a second end of the second power line segment from a second remote IED;

a first differential protection subsystem to detect a fault condition based on a comparison of the local current measurement data for the first end of the first power line segment and the remote current measurement data for the second end of the first power line segment from the first remote IED, wherein the first differential protection subsystem utilizes two independent differential channels with a voting scheme implementing a logical AND, such that both differential channels assert before declaring a fault condition;

a second differential protection subsystem to detect a fault condition based on a comparison of the local current measurement data for the first end of the second power line segment and the remote current measurement data for the second end of the second power line segment from the second remote IED; and a protection subsystem operable to:

implement a protective action on the first power line segment in response to fault detection by the first differential protection subsystem, and implement the protective action on the second power line segment in response to fault detection by the second differential protection subsystem.

2. The IED of claim 1, wherein the local sensor subsystem comprises a current transformer (CT) device on the first end of the first power line segment.

3. The IED of claim 1, wherein the local sensor subsystem comprises a communication interface to receive digital current measurement data from a merging unit connected to a current transformer (CT) device on the first end of the first power line segment.

4. The IED of claim 1, wherein the protective action implemented by the protection subsystem comprises opening a breaker.

5. The IED of claim 1, wherein the communication interface is further configured to receive remote current measurement data for the second end of the first power line segment from the second remote IED, and further comprising:

internal decision logic to select between: (i) the remote current measurement data for the second end of the first power line segment provided by the first remote IED and (ii) the remote current measurement data for the second end of the first power line segment provided by second remote IED.

6. The IED of claim 1, further comprising:

a third differential protection subsystem to detect a fault condition based on a comparison of local current measurement data for a first end of a third power line segment and remote current measurement data for a second end of the third power line segment, wherein the local sensor subsystem is further configured to obtain local current measurement data for the first end of the third power line segment, wherein the communication interface is further configured to receive remote current measurement data for the second end of the third power line segment from a third remote IED, and wherein the protection subsystem is further operable to implement a protective action on the third power line segment in response to fault detection by the third differential protection subsystem.

7. The IED of claim 6, wherein the communication interface is further configured to:

receive remote current measurement data for the second end of the first power line segment from the second remote IED, and receive remote current measurement data for the second end of the first power line segment from the third remote IED, and further comprising:

internal decision logic to select between: (i) the remote current measurement data for the second end of the first power line segment provided by the first remote IED, (ii) the remote current measurement data for the second end of the first power line segment provided by second remote IED, and (iii) the remote current measurement data for the second end of the first power line segment provided by the third remote IED.

8. The IED of claim 1, wherein the IED operates as a first local IED and the communication interface is further configured to communicate with a second local IED to coordinate protection of the first and second power line segments, wherein the second local IED comprises:

a local sensor subsystem to obtain:

local current measurement data from the first end of the first power line segment and local current measurement data from the first end of the second power line segment;

a communication interface to receive:

remote current measurement data from the second end of the first power line segment from the first remote IED, and remote current measurement data from the second end of the second power line segment from the second remote IED;

a first differential protection subsystem to detect a fault condition based on a comparison of the local current measurement data from the first end of the first power line segment and the remote current measurement data from the second end of the first power line segment from the first remote IED;

a second differential protection subsystem to detect a fault condition based on a comparison of the local current measurement data from the first end of the second power line segment and the remote current measurement data from the second end of the second power line segment from the second remote IED; and a protection subsystem operable to:

implement a protective action on the first power line segment in response to fault detection by the first differential protection subsystem, and implement the protective action on the second power line segment in response to fault detection by the second differential protection subsystem.

9. The IED of claim 1, wherein each of the first and second power line segments comprises a three-phase power line segment, wherein the first differential protection subsystem comprises a first line current differential relay device with phase-segregated measurements for each phase of the first power line segment, and wherein the second differential protection subsystem comprises a second line current differential relay device with phase-segregated measurements for each phase of the second power line segment.

10. The IED of claim 9, wherein the protection subsystem is operable to:

implement single-pole tripping of a breaker on one phase line of the first power line segment in response to fault detection of a single conductor by the first differential protection subsystem, and implement single-pole tripping of a breaker on one phase line of the second power line segment in response to fault detection of a single conductor by the second differential protection subsystem.

11. The IED of claim 1, wherein the first power line segment and the second power line segment are sequential segments of a distribution power line, wherein the first remote IED is positioned in a first direction along the distribution power line, and wherein the second remote IED is positioned in a second direction along the distribution power line, such that the local current measurement data for the first ends of the first and second power line segments is from a location on the distribution power line between the first and second remote IEDs.

12. A protection system for multi-channel differential protection of first and second transmission line segments, comprising:

first and second intelligent electronic devices (IEDs) positioned at a first end of the first and second transmission line segments, each of the first and second IEDs including:

a sensor subsystem to obtain current measurement data for the first ends of each of the first and second transmission line segments;

a communication interface to:

receive current measurement data for the second ends of the first and second transmission line segments from each of a third IED and a fourth IED, and transmit the obtained current measurement data for the first ends of the first and second transmission line segments to each of the third and fourth IEDs;

a first differential protection subsystem to detect a fault condition based on a comparison of the current measurement data for the first end of the first transmission line segment and the current measurement data for the second end of the first transmission line segment;

a second differential protection subsystem to detect a fault condition based on a comparison of the current measurement data for the first end of the second transmission line segment and the current measurement data for the second end of the second transmission line segment;

a coordination interface to facilitate coordination communications between the first and second IEDs; and a coordinated protection subsystem operable to selectively implement coordinated protective actions on the first and second transmission line segments based on the coordination communications between the first and second IEDs, wherein each differential protection subsystem of each of the first and second IEDs is configured to implement an internal voting scheme based on two independent differential channels corresponding to (i) the current measurement data for the second end of a corresponding transmission line segment received from the third IED and (ii) the current measurement data for the second end of the corresponding transmission line segment received from the fourth IED, and to detect the fault condition in response to both independent differential channels detecting the fault condition.

13. The protection system of claim 12, wherein the coordinate communication between the first and second IEDs comprises data for comparing detected fault condition statuses for each of the first and second transmission line segments, and wherein each of the first and second IEDs further includes decision logic for selecting between differing fault condition statuses of the first and second IEDs for a given transmission line segment to coordinate whether to implement a protective action.

14. The protection system of claim 12, wherein each of the third and fourth IEDs comprises:

a sensor subsystem to obtain the current measurement data for the second ends of each of the first and second transmission line segments;

a communication interface to:

receive current measurement data for the first ends of the first and second transmission line segments from each of the first IED and second IEDs, and transmit the obtained current measurement data for the second ends of the first and second transmission line segments to each of the first and second IEDs;

a first differential protection subsystem to detect a fault condition based on a comparison of the current measurement data for the first end of the first transmission line segment and the current measurement data for the second end of the first transmission line segment;

a second differential protection subsystem to detect a fault condition based on a comparison of the current measurement data for the first end of the second transmission line segment and the current measurement data for the second end of the second transmission line segment;

a coordination interface to facilitate coordination communications between the third and fourth IEDs; and a coordinated protection subsystem operable to selectively implement coordinated protective actions on the first and second transmission line segments based on the coordination communications between the third and fourth IEDs.

15. The protection system of claim 14, wherein the sensor subsystem of each of the first, second, third, and fourth IEDs comprises a current transformer (CT) device.

16. The protection system of claim 14, wherein the sensor subsystem of each of the first, second, third, and fourth IEDs comprises a communication interface to receive digital current measurement data from a merging unit connected to a current transformer (CT) device.

17. The protection system of claim 14, wherein the coordinated protective action selectively implemented by the coordinated protection subsystems comprises tripping a breaker.

18. The protection system of claim 14, wherein each of the first and second transmission line segments comprises a segment of a three-phase transmission line, wherein each differential protection subsystem of each of the first, second, third, and fourth IEDs comprises a differential relay device with phase-segregated measurements for each phase of each of the first and second transmission line segments.

19. An intelligent electronic device (IED) to provide multi-channel differential protection to N adjacent transmission lines, where N is an integer, the IED comprising:

a local sensor subsystem to obtain local current measurement data for a first end of each of the N transmission lines;

a communication interface to receive remote current measurement data for a second end of each of the N transmission lines from a plurality of remote IEDs positioned proximate to the second ends of the N transmission lines;

N differential protection subsystems, wherein each differential protection subsystem operates to detect a fault condition on one of the N transmission lines based on a comparison of local current measurement data for the first end of each respective transmission line and the remote current measurement data for the second end of each respective transmission line, and wherein at least one of the N differential protection subsystems comprises two independent differential channels operating concurrently to protect the same one of the N transmission lines, and wherein the at least one differential protection subsystem detects the fault condition based on outputs of the two independent differential channels being ANDed together by an internal voting scheme within the IED;

a local coordination subsystem to facilitate coordination communications with a plurality of local IEDs positioned proximate to the first ends of the N transmission lines, the coordination communications including at least one of (i) received remote current measurement data and (ii) detected fault conditions; and a coordinated protection subsystem operable to implement a protective action on any of the N transmission lines based on a fault detection by a corresponding differential protection subsystem and the coordination communications.

20. The IED of claim 19, wherein the communication interface is further configured to transmit the obtained local current measurement data for the first ends of the N transmission lines to each of the plurality of remote IEDs.

21. The IED of claim 19, wherein the plurality of remote IEDs comprises N remote IEDs, and wherein the plurality of local IEDs comprises N-1 IEDs.

22. An intelligent electronic device (IED) to provide differential protection, comprising:

a local sensor subsystem to obtain local differential current measurement data for a first end of a power line segment;

a communication interface to receive remote differential current measurement data for a second end of the power line segment from a remote IED;

a differential protection subsystem to detect a fault condition based on an analysis of the local differential current measurement data for the first end of the power line segment and the remote differential current measurement data for the second end of the power line segment from the remote IED, wherein the differential protection subsystem utilizes a voting scheme to detect the fault condition in response to a discrepancy between the local differential current measurement data and the remote differential current measurement data, the voting scheme comprising using two independent differential channels to AND their outputs together before declaring the fault condition; and a protection subsystem operable to implement a protective action on the power line segment in response to fault detection by the differential protection subsystem.

* * * * *